United States Patent
Wong et al.

(10) Patent No.: US 6,486,233 B1
(45) Date of Patent: Nov. 26, 2002

(54) ABLATOR COMPOSITION

(75) Inventors: Jim L. Wong, Diamond Bar, CA (US); George P. Johnson, Huntington Beach, CA (US)

(73) Assignee: The Boeing Company, Irvine, CA (US)

( * ) Notice: Subject to any disclaimer, the term of this patent is extended or adjusted under 35 U.S.C. 154(b) by 0 days.

(21) Appl. No.: 09/470,895

(22) Filed: Dec. 22, 1999

(51) Int. Cl.⁷ .............................................. C08K 21/14
(52) U.S. Cl. ..................................................... 523/179
(58) Field of Search ..................... 428/411.1; 523/179

(56) References Cited

U.S. PATENT DOCUMENTS

| | | | | |
|---|---|---|---|---|
| 3,380,941 A | | 4/1968 | Dittman et al. ............. 260/17.4 |
| 3,816,226 A | * | 6/1974 | Finelli .......................... 161/48 |
| 3,992,997 A | * | 11/1976 | McCubbin ................... 102/56 |
| 4,031,059 A | | 6/1977 | Strauss .................. 260/37 SB |
| 4,077,921 A | | 3/1978 | Sharpe et al. ............ 260/2.5 B |
| 4,114,369 A | * | 9/1978 | Crowley ....................... 60/200 |
| 4,204,899 A | | 5/1980 | Walker et al. ............... 156/212 |
| 4,324,835 A | * | 4/1982 | Keen ........................... 521/54 |
| 4,595,714 A | | 6/1986 | McAllister et al. .......... 523/179 |
| 4,772,495 A | | 9/1988 | Headrick et al. ............ 427/386 |
| 4,837,250 A | | 6/1989 | Headrick et al. ............ 523/179 |
| 4,888,057 A | | 12/1989 | Nguyen et al. .......... 106/18.12 |
| 4,992,481 A | * | 2/1991 | Bonin .......................... 521/54 |
| 5,064,868 A | | 11/1991 | Simpson et al. ............... 521/54 |
| 5,206,088 A | * | 4/1993 | Raevsky ..................... 428/413 |
| 5,401,793 A | * | 3/1995 | Kobayashi .................. 524/401 |
| 5,433,991 A | * | 7/1995 | Boyd .......................... 428/193 |
| 5,532,292 A | * | 7/1996 | Wainwright ................. 523/219 |
| 5,661,198 A | | 8/1997 | Inatani et al. ................ 523/179 |
| 5,721,281 A | * | 2/1998 | Blount ......................... 521/50 |

* cited by examiner

Primary Examiner—Paul R. Michl
(74) Attorney, Agent, or Firm—Lawrence N. Ginsberg

(57) ABSTRACT

During the application of heat the intumescent coating is transformed into a swollen char material, which acts as a thermal barrier to eliminate or minimize incoming heat flux. It also acts as a mass transfer barrier, inhibiting oxygen from reaching the thermally insulative ablative material. During the intumescence process, the swollen material will also back fill into interstices within the ablative material and char to enhance their strength. The intumescent coating also acts as a moisture barrier to protect the thermally insulative ablative material from ambient elements such as moisture.

21 Claims, 3 Drawing Sheets

ABLATOR COMPOSITION

BACKGROUND OF THE INVENTION

1. Field of the Invention

The present invention relates to ablator compositions and more particularly to an ablator composition, which utilizes an intumescent coating.

2. Description of the Related Art

Launch vehicle configurations often employ solid rocket boosters (SRB's) to augment the thrust of the main engine. Because of the proximity of the SRB plumes to the base region of the main engine, the convective and radiative heating augmentations to the base region of the main engine due to these SRBs are substantial. A layer of low temperature ablative (LTA) is needed to protect the structure in this region. The thermal, mechanical and chemical performances of the ablatives in the hostile environment produced by the rocket exhaust are of importance in the design of the thermal protection system. The requirements imposed on the insulation are as follows:

1. Ability to withstand the aerodynamic loads and aeroheating encountered during flight;
2. Protection and maintenance of the substructure below a critical temperature;
3. Light weight, low cost and ease to manufacture and to install;
4. Ability to withstand thermal shock due to launch plume heating;
5. Ability to withstand the mechanical and acoustic vibration environment; and
6. Chemical and mechanical compatibility with adhesive and substructure throughout the entire flight.

When an external heat flux is applied to the base of the main engine, the LTA material protecting this region may decompose in-depth and recede at its surface. The modes of surface recession may include combinations of phase change processes such as melting, sublimation, as well as, exothermic or endothermic chemical reactions such as oxidation and combustion. Similarly, in-depth decomposition, such as pyrolysis, may involve outgassing, phase change and chemical reactions. The ablation performance of these LTA are often characterized by q* or 37 heat of ablation" defined as $$q^* = qdot/mdot,$$

where qdot is the net heat flux=$q_{hw}$-$q_{rad}$;

mdot is the rate of mass loss;

$q_{hw}$=convective hot wall flux; and $q_{rad}$=net radiative heat flux.

The primary mechanisms for the LTA to counter the applied heat flux are high heat of ablation and low thermal conduction. Thus, the ideal properties of LTA include low density and thermal conductivity, ease of manufacturing and installation, and the ability to withstand flight conditions.

Another desirable property of an ideal LTA is to form strong char during the ablation process. If the strength of the char adhering to the surface is sufficient to keep it from being swept away by aerodynamic shear forces and acoustic vibrations, the performance of the insulation can be improved because of:

a) Increased thermal protection since less material is removed;
b) Increased thermal protection since the char in general is porous, lightweight and has low thermal conductivity; and
c) Increased radiant heat loss from surface since the char in general has higher emissivity and can withstand high temperature. The higher surface temperature also reduces convective heat gain.

Cork, with over 200 million cells per cubic inch, is often chosen as the LTA thermal protection system (TPS) because of the structure and mechanics of these cells. It is used as insulation material for launch vehicles because of its low density yet resilient mechanical properties; minimal cost; its ability to absorb vibration and withstand acoustic noise; and, its chemically stability. This natural product is cleaned, ground, mixed with various resins such as phenolic and formed into complex shapes. Common cork based TPS materials include cork epoxy, cork phenolic and cork silicone.

The combustion of cork and phenolic resin to form weakened char is the single most important failure mode of the cork phenolic heatshield materials. When the material is exposed to high heat flux and oxygen from ambient atmosphere, the cork-based ablatives quickly char and begin burning. Once ignited, the ablatives will continue to burn even after the external heat source is turned off. As the cork phenolic TPS ablates, the surface of the TPS will form char with cracks, the size of which increases with time. Eventually the remaining material will break and erode away due to the mechanical load or aerodynamic shear.

A typical launch vehicle may sit on the launch pad for days prior to flight, and often the TPS can absorb a significant amount of moisture if left unprotected. Existing families of launch vehicles often employ a coating of paint to seal the TPS. The launch vehicles may also have an additional layer of electrically conductive paint to ground electrical charges in the atmosphere.

The layer of LTA needed to protect the structure from excessive convective and radiative heating can add substantial weight, cost, technical risk and performance penalties to the launch vehicle's manufacturer and integration team.

OBJECTS AND SUMMARY OF THE INVENTION

It is therefore a principal object of the present invention to provide an improved ablative composition, which can be applied to a substrate to protect the substrate from external heat flux.

It is another object to coat an ablative material such that during exposure to heat, the coating will swell to provide a thermal barrier, inhibit ambient air from contacting the ablative material, and provide a back fill into interstices within the ablative material and char to enhance their strength.

Another object is to provide an ablative composition with a moisture barrier.

Still another object is to provide an ablative composition with a layer of electrically conductive coating to ground electrical charges in the atmosphere.

Yet another object is to provide an ablative composition with a coating to reflect incoming radiant heat flux.

These and other objects are achieved by the present invention, which in its broadest aspects comprises a thermally insulative ablative material and an intumescent coating covering the thermally insulative ablative material. During the application of heat the intumescent coating is transformed into a swollen char material, which acts as a thermal barrier to eliminate or minimize incoming heat flux. It also acts as a mass transfer barrier, inhibiting oxygen from reaching the thermally insulative ablative material. During the intumescence process, the swollen material will also back fill into interstices within the ablative material and char to enhance their strength. The intumescent coating also acts as a moisture barrier to protect the thermally insulative ablative material from ambient elements such as moisture. The intumescent coating also acts as the electrically conductive paint to ground electrical charges in the atmosphere. The intumescent coating preferably contains particulate to reflect incoming radiant heat flux.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
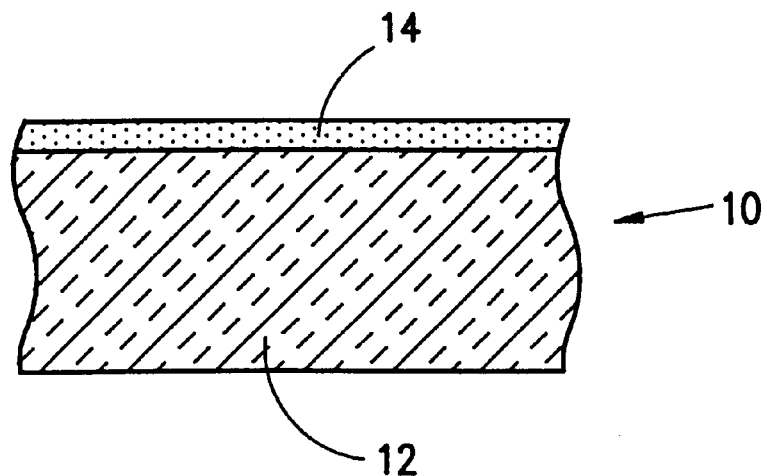
FIG. 1 is a cross-sectional view of a first embodiment of the ablator composition of the present invention.

Referring now to the drawings and the characters of reference marked thereon, FIG. 1 illustrates a first embodiment of the ablator composition of the present invention, designated generally as 10. Ablator composition 10 includes a thermally insulative ablative material 12 and an intumescent coating 14 covering the thermally insulative ablative material 12.

The thermally insulative ablative material 12 may be a cork phenolic material, which is particularly advantageous for launch vehicle applications. Other possible materials may include, but are not limited to, cork epoxies, cork silicones, silicones, carbon-carbons, carbon-phenolics, graphites, silicon phenolics and ceramics.

The thermally insulative ablative material 12 has a thermal conductivity in a range of 0.1 to 10 BTU-in/hr/ft$^2$/ft, preferably in a range of 0.1 to 0.5 BTU-in/hr/ft$^2$/ft.

The intumescent coating 14 will transform to a swollen char material upon heating. It has intumescent swelling in a range of 50% to 2000% of the original thickness of the coating. Preferably, the intumescent swelling is in a range of 200% to 1000%.

The intumescent coating 14 may comprise a number of commercially available paints. These paints often have ammonium polyphosphate as a swelling agent, which provides the necessary intumescence. Such paints are marketed by a number of commercial vendors, that include, for example Albi Manufacturing, American Vamag Company, Inc., Barnard Products, Inc., Carboline Company, Fiber Materials, Inc., Fire Research Laboratories, Flame Control Coatings, Inc., Flame Stop, Inc., Flamort Chemical Company, Gilman Paint, M.A. Bruder & Sons, Materials Sciences and Technologies, Inc., NoFire, Inc., PPG Industries, Inc., Preservative Paint Company, Technical Coatings Inc., Textron Specialty Materials, Thermal Science, Inc., and Vimasco Corporation.

The intumescent coating 14 may be applied by spraying, rolling, trowelling, brushing or other conventional coating application methods.

The intumescent coating 14 has a thickness of 1 mil to 100 mils, preferably 5 mils to 20 mils. The paint should be of sufficient thickness to be an effective moisture barrier for a particular application. In an aerospace application, a launch vehicle may sit on the launch pad for several days. The thermally insulative ablative material 12 must therefore be coated with a moisture barrier. The ability of the intumescent coating 14 to inhibit moisture penetration in such an application can be enhanced by adding acrylic, latex, or epoxy to the intumescent coating 14.

The temperature at which intumescence begins is known as the intumescence on-start temperature. The intumescent coating 14 has an intumescence on-start temperature in a range of 300° F. to 1600° F., preferably in a range of between 500° F. to 1000° F.

Since the external heat source often has a high percentage of radiative heat flux, the intumescent coating 14 should be capable of reflecting light in the range of 0.4 to 10 microns, preferably 1 to 4 microns. This can be achieved by adding metallic particulate of proper diameter.

A launch vehicle often has an electrically conductive coating to ground any electrical charge in the atmosphere. The quantity of metallic particulate in the intumescent coating 14 should be sufficient to provide the needed electrical conductance. Suitable additives include, for example: metallic particulate such as silver, copper, tungsten, and other heavy refractory metals, non-metallic particulate such as graphite, and microspheres coated with combination of such materials. These microspheres are often hollow to reduce weight, and are commonly referred to as microballoons.

During intumescence, the intumescent coating 14 will swell and act as a thermal barrier to eliminate or minimize the external heat flux. This coating 14 also acts as a mass transfer barrier to inhibit oxygen from reaching the surface of the thermally insulative ablative material 12. The swollen intumescent coating 14 also back fills surface imperfections of the thermally insulative ablative material 12 and its char to strengthen such materials.

Figure 2:
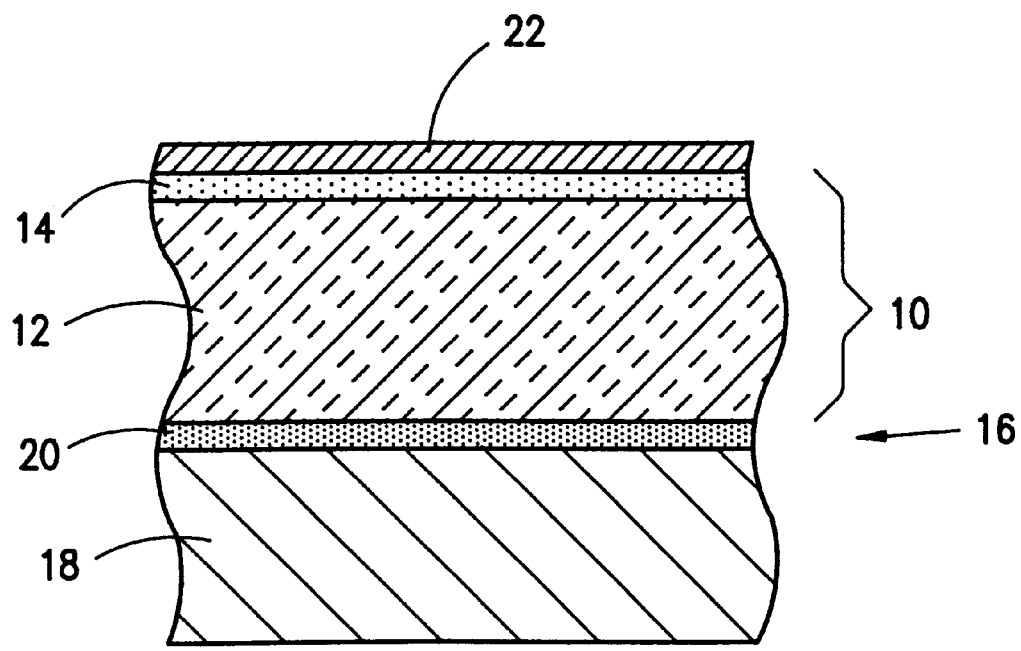
FIG. 2 is a cross-sectional view of a second embodiment of the present invention having an electrically conductive coating and substrate secured thereto.

Referring now to FIG. 2, a second embodiment of the present invention is illustrated, designated generally as 16, in which a substrate 18 supports the ablator composition 10. The substrate 18 may be a structural material; for example, aluminum, titanium, or composite. The thermally insulative ablative material 12 may be secured to the substrate 18 with an adhesive 20 or fasteners (not shown). The thickness of the thermally insulative ablative material 12 should be sufficient to keep the substrate 18 or adhesive 20 below a critical temperature.

FIG. 2 also illustrates how an electrically conductive coating 22 may be applied over the intumescent coating 14 to provide the electrical grounding, as discussed above.

Figure 3:
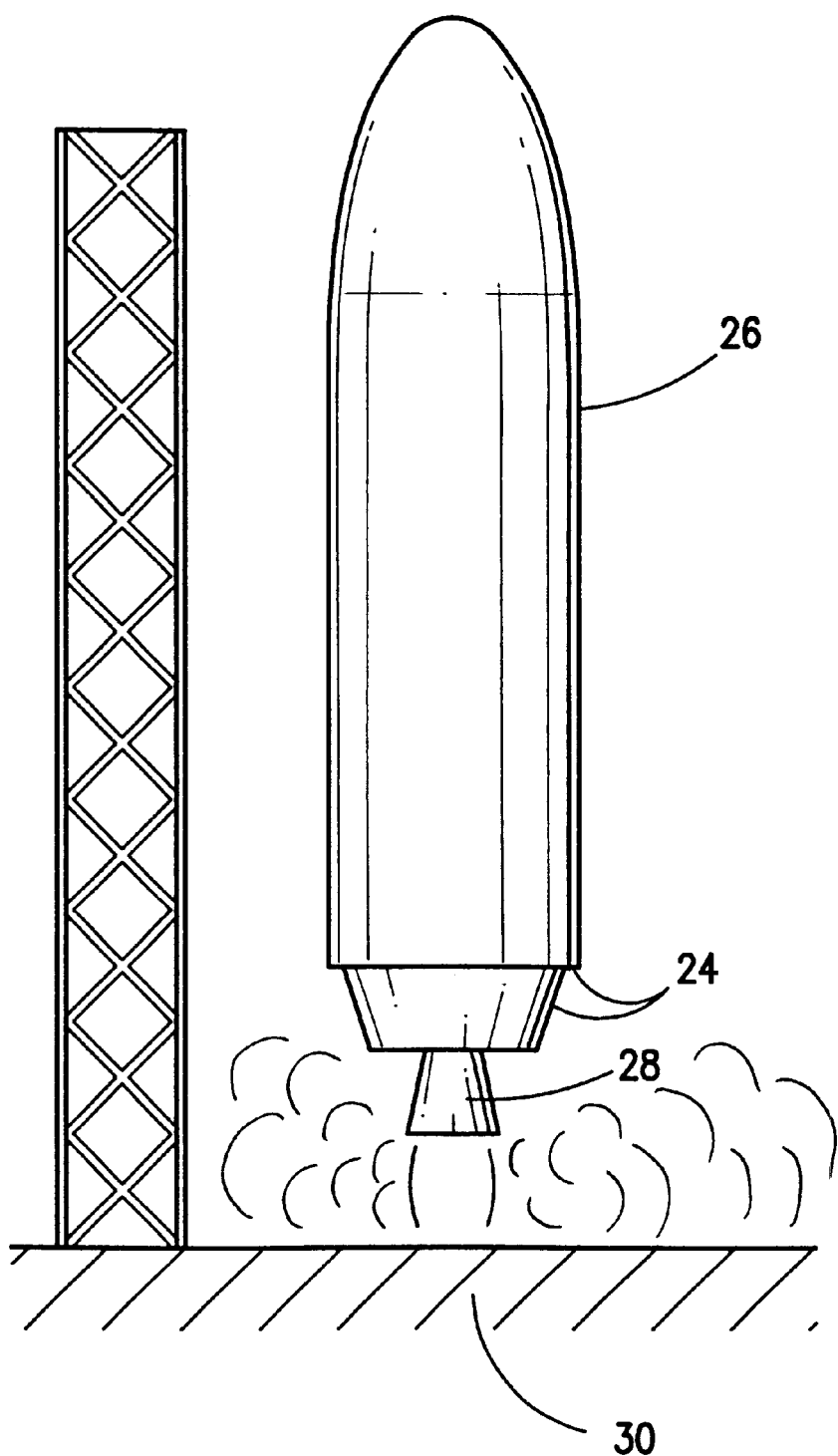
FIG. 3 is a schematic illustration showing application of the ablator composition to a base of a launch vehicle.

Referring now to FIG. 3, application of the ablator composition 10 to the base structure of a base 24 of a launch vehicle 26, which may have one or more main engines 28, is illustrated. (While FIG. 3 does not show any solid rocket boosters, it is understood that the present inventive concepts are applicable to situations where the launch vehicle may have none, or one or more strap-on solid rocket boosters.) Each of the solid rocket boosters may have its own motor. The main engines and the solid rocket boosters, when ignited, emit plumes of gas that may impact the launch pad 30 and recirculate. These plumes may heat the base 24, convectively, or radiatively. As a launch vehicle ascends, the recirculating effect diminishes and the heating level drops. At higher altitudes these plumes expand and may interact with one another. This increases the heating of the base 24.

Figure 4:
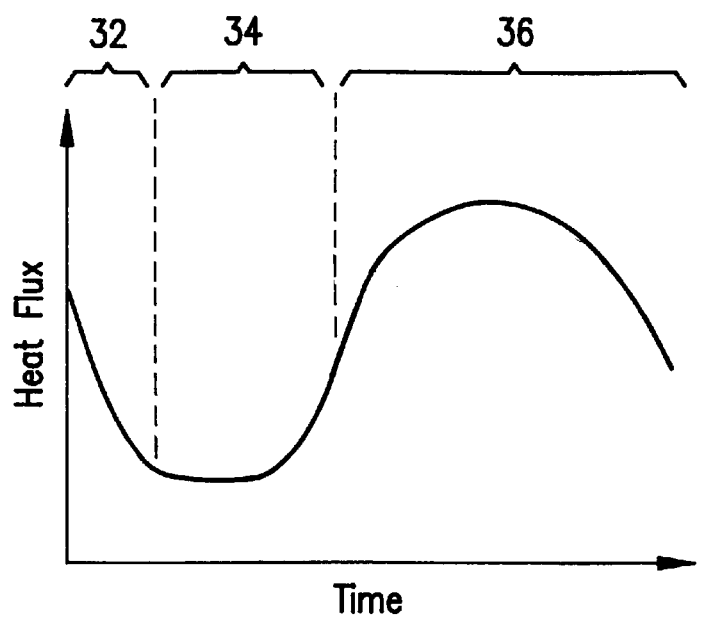
FIG. 4 is a graph of heat flux vs. time, illustrating the heat flux history of the base of a launch vehicle.

Referring now to FIG. 4, a heat flux history of the base of a launch vehicle is shown. The heat flux history can be divided into a launch pad clearing phase 32 where the heat flux is high, followed by a low altitude ascent phase 34 where the heat flux is low. This is followed by a high altitude ascent 36 where the heat flux is high. With existing ablative designs, the high heat flux during the launch pad clearing phase may ignite the thermally insulative ablative material 12, which continues to burn during the low altitude ascent phase 34 even though the heating level drops. The present invention utilizes the intumescent coating 14, which is sized so that the temperature of the thermally insulative ablative material 12 remains below the ablation temperature of the thermally insulative ablative material 12 during the launch pad clearing phase 32. Also, the intumescent coating 14, acts as a mass transfer barrier, inhibiting oxygen from reaching the thermally insulative ablative material 12. As noted above, the intumescent coating 14 also provides back filling. As a result, a thinner layer of thermally insulative ablative material 12 is required. It is understood that, while the present invention has been described with respect to its application to the base of a launch vehicle, its application is not limited to such a region. The present invention is particularly usefull in any region of the vehicle that senses a heating pattern similar to FIG. 4.

Figure 5:
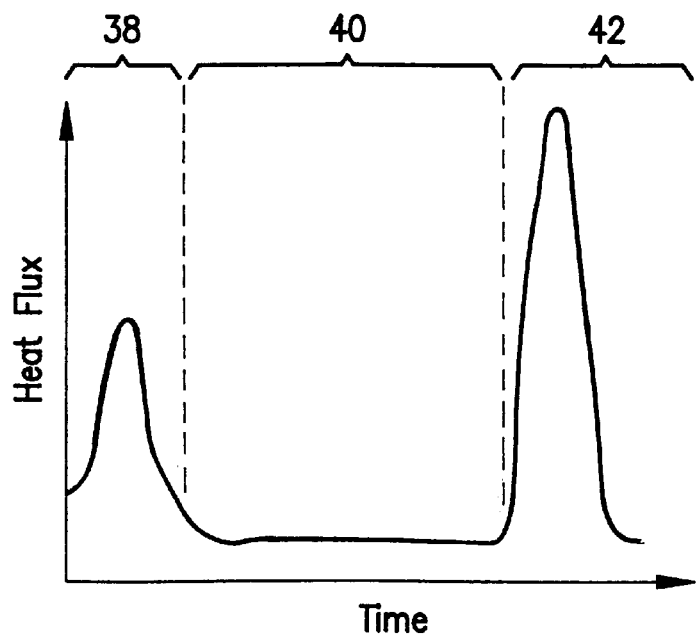
FIG. 5 is a graph of heat flux vs. time, illustrating the heat flux history of a cruise missile.

Referring now to FIG. 5, a heat flux history of the outer surface of a cruise missile, is shown. In this example, the heat flux history can be characterized as an ascent phase 38 followed by a cruise phase 40, followed by a reentry phase 42. The intumescent coating 14 is sized so that the temperature of the thermally insulative ablative material 12 remains below the ablation temperature of the thermally insulative ablative material 12 during the ascent phase 38.

Although the application of the ablator composition 10 of the present invention has been described with particularity with respect to its use on a launch vehicle it is understood that it may be used for other expendable aerospace applications.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. A base for a launch vehicle, comprising:
   a) a base structure; and
   b) an ablator composition covering at least a portion of said base structure, comprising;
      i) a thermally insulative ablative material being transformable to char material during application of sufficient heat; and
      ii) a light reflecting intumescent coating covering said term any insulative ablative material, said intumescent coating being transformable into a swollen char material during application of sufficient heat, the swollen char material of the intumesent coating for strengthening the char material of the ablative material, said intumescent coating comprising metallic particulate capable of reflecting light in the range of 0.4 to 10 microns ($\mu$m).

2. The base of claim 1, wherein said launch vehicle operates in a launch pad clearing phase followed by a low altitude ascent phase, followed by a high altitude ascent phase, said intumescent coating being sized so that the temperature of the thermally insulative ablative material remains below the ablation temperature of the thermally insulative ablative material during said launch pad clearing phase.

3. A base for a launch vehicle of claim 1, wherein said thermally insulative ablative material has a thermal conductivity in a range of 0.1 to 10 BTU-in/hr/ft$^2$/ft.

4. A base for a launch vehicle of claim 1, wherein said thermally insulative ablative material has a thermal conductivity in a range of 0.1 to 0.5 BTU-in/hr/ft$^2$/ft.

5. A base for a launch vehicle of claim 1, wherein said intumescent coating has intumescent swelling in a range of 50% to 2,000%.

6. A base for a launch vehicle of claim 1, wherein said intumescent coating has intumescent swelling in a range of 200% to 1,000%.

7. A base for a launch vehicle of claim 1, wherein said intumescent coating has a thickness of 1 mil to 100 mils.

8. A base for a launch vehicle of claim 1, wherein said intumescent coating has a thickness of 5 mils to 20 mils.

9. A base for a launch vehicle of claim 1, further including an electrically conductive coating positioned over said intumescent coating for electrical discharge protection.

10. A base for a launch vehicle of claim 1, wherein said base structure comprises aluminum.

11. A base for a launch vehicle of claim 1, wherein said base structure comprises titanium.

12. A base for a launch vehicle of claim 1, wherein said base structure comprises composite material.

13. A base for a launch vehicle of claim 1, wherein said intumescent costing has an intumescence on-start temperature in a range of between 300° F. to 1,600° F.

14. A base for a launch vehicle of claim 1, wherein said intumescent coating has an intumescence on-start temperature in a range of between 500° F. to 1,000° F.

15. A base for a launch vehicle of claim 1, wherein said intumescent coating comprises metallic particulate capable of reflecting light in the range of 1 to 4 microns.

16. A base for a launch vehicle of claim 1, wherein said intumescent coating includes sufficient metallic particulate such that the intumescent coating is electrically conductive.

17. A base for a launch vehicle of claim 1, wherein said intumescent coating comprises acrylic so as to provide a moisture barrier.

18. A base for a launch vehicle of claim 1, wherein said intumescent coating comprises latex so as to provide a moisture barrier.

19. A base for a launch vehicle of claim 1, wherein said intumescent coating comprises epoxy so as to provide a moisture barrier.

20. A base for a launch vehicle of claim 1, wherein said insulative ablative material comprises cork phenolic material.

21. A base for a launch vehicle of claim 1, wherein said intumescent coating comprises ammonium polyphosphate.

* * * * *